(12) United States Patent
Shu et al.

(10) Patent No.: US 10,288,495 B2
(45) Date of Patent: May 14, 2019

(54) MIXED-MODE TEMPERATURE MEASUREMENT COMMUNICATION PHASE CONDUCTOR AND TEMPERATURE MEASUREMENT COMMUNICATION SYSTEM

(71) Applicants: STATE GRID CORPORATION OF CHINA, Beijing (CN); STATE GRID BEIJING ELECTRIC POWER COMPANY, Beijing (CN); BEIJING ELECTRIC POWER ECONOMIC RESEARCH INSTITUTE, Beijing (CN)

(72) Inventors: Bin Shu, Beijing (CN); Ying Zhang, Beijing (CN); Kai Zhang, Beijing (CN); Weiyong Wang, Beijing (CN); Wei Li, Beijing (CN); Hongli Yu, Beijing (CN); Yifan Lin, Beijing (CN); Zhanwei Zhu, Beijing (CN); Zhihui Wang, Beijing (CN)

(73) Assignees: STATE GRID CORPORATION OF CHINA, Beijing (CN); STATE GRID BEIJING ELECTRIC POWER COMPANY, Beijing (CN); BEIJING ELECTRIC POWER ECONOMIC RESEARCH INSTITUTE, Beijing (CN)

( * ) Notice: Subject to any disclaimer, the term of this patent is extended or adjusted under 35 U.S.C. 154(b) by 304 days.

(21) Appl. No.: 14/650,225

(22) PCT Filed: Jul. 16, 2013

(86) PCT No.: PCT/CN2013/079466
§ 371 (c)(1),
(2) Date: Jun. 5, 2015

(87) PCT Pub. No.: WO2014/086148
PCT Pub. Date: Jun. 12, 2014

(65) Prior Publication Data
US 2015/0308904 A1 Oct. 29, 2015

(30) Foreign Application Priority Data
Dec. 6, 2012 (CN) .......................... 2012 1 0521712

(51) Int. Cl.
*G01K 11/32* (2006.01)
*G02B 6/44* (2006.01)
(Continued)

(52) U.S. Cl.
CPC ............ *G01K 11/32* (2013.01); *G02B 6/4422* (2013.01); *G02B 6/4429* (2013.01);
(Continued)

(58) Field of Classification Search
CPC .............. G01K 11/32; G01K 2011/324; G01B 2006/12107; G01B 2006/12138; H01B 5/108
(Continued)

(56) References Cited

U.S. PATENT DOCUMENTS 6,054,070 A * 4/2000 Tokairin .............. B29C 47/0028
264/1.28
2004/0124001 A1 7/2004 Sanders

FOREIGN PATENT DOCUMENTS

CN 1052369 A * 6/1991
CN 1052369 A 6/1991
(Continued)

OTHER PUBLICATIONS

Google translation of CN201936681U—Wu.*
(Continued)

*Primary Examiner* — Nathaniel T Woodward
(74) *Attorney, Agent, or Firm* — Innovation Capital Law Group, LLP; Vic Lin

(57) ABSTRACT

The disclosure provides a mixed-mode temperature measurement communication phase conductor and a temperature measurement communication system. The mixed-mode temperature measurement communication phase conductor includes: a stainless sleeving optical unit and a support line hinged with the stainless sleeving optical unit, wherein an aluminum wire is hinged outside the stainless sleeving optical unit and the support line; the stainless sleeving optical unit includes: multiple single-mode fibers and at least one multi-mode fiber, wherein fibers in the stainless sleeving optical unit are mutually hinged. The disclosure realizes whole-distance temperature measurement of conductor by (Continued)

setting the single-mode fiber to perform communication and the multi-mode fiber to perform temperature measurement.

12 Claims, 1 Drawing Sheet

(51) Int. Cl.
    *H01B 5/10*         (2006.01)
    *G02B 6/12*         (2006.01)

(52) U.S. Cl.
    CPC .............. *G01K 2011/324* (2013.01); *G02B 2006/12107* (2013.01); *G02B 2006/12138* (2013.01); *H01B 5/108* (2013.01)

(58) Field of Classification Search
    USPC ........................................................ 374/161
    See application file for complete search history.

(56) References Cited

FOREIGN PATENT DOCUMENTS

| | | | |
|---|---|---|---|
| CN | 101923921 A | | 12/2010 |
| CN | 102012285 A | | 4/2011 |
| CN | 201820023 U | * | 5/2011 |
| CN | 201936681 U | * | 8/2011 |
| CN | 201936681 U | | 8/2011 |
| CN | 102360633 A | | 2/2012 |
| CN | 202197280 U | | 4/2012 |
| CN | 102468008 A | * | 5/2012 |
| CN | 102468008 A | | 5/2012 |
| CN | 202512945 U | | 10/2012 |
| CN | 202957055 U | | 5/2013 |
| DE | 19844753 A1 | | 2/2000 |
| EP | 0978715 A1 | | 2/2000 |
| WO | 2009014649 A1 | | 1/2009 |

OTHER PUBLICATIONS

Google translation of CN102468008A—Guo.*
Google translation of CN1052369A—Tian Qian.*
Translation of CN 201820023 U.*
International Search Report for PCT/CN2013/079466, filed on Jul. 16, 2013.

* cited by examiner

MIXED-MODE TEMPERATURE MEASUREMENT COMMUNICATION PHASE CONDUCTOR AND TEMPERATURE MEASUREMENT COMMUNICATION SYSTEM

FIELD OF THE INVENTION

The disclosure relates to the field of communications, and in particular to a mixed-mode temperature measurement communication phase conductor and a temperature measurement communication system.

BACKGROUND OF THE INVENTION

Due to large capacity, high confidentiality, insusceptibility to electromagnetic interference and other advantages, optical fibre communication is widely applied to electric system communication, and plays an important role in the increasingly demanding electric system communication.

Optical Phase Conductor (OPPC) is a new type special electric optical cable formed by embedding a fibre unit in the traditional conductor structure, with the capability of traditional overhead conductor and communication; generally, OPPC replaces one or more steel threads in the traditional transmission conductor by a stainless tube optical unit, enabling the stainless tube optical unit to be hinged with a (aluminium) steel wire and an aluminium (alloy) wire. But, due to broken strand or hardware fittings problems, the conductor generates high temperature locally and operates dangerously, thus it is needed to detect and handle as soon as possible; however, the traditional OPPC can not realize whole-distance temperature measurement of the conductor and thus can not find the problem of local high temperature of conductor immediately.

For the problem that the traditional OPPC in relevant art can not realize whole-distance temperature measurement of the conductor, there has no effective solution.

SUMMARY OF THE INVENTION

The disclosure aims at providing a mixed-mode temperature measurement communication phase conductor and a temperature measurement communication system, to solve the problem that the traditional OPPC can not realize whole-distance temperature measurement of the conductor.

In order to achieve the above aim, according to one aspect, the disclosure provides a mixed-mode temperature measurement communication phase conductor, including: a stainless sleeving optical unit and a support line hinged with the stainless sleeving optical unit, wherein an aluminium wire is hinged outside the stainless sleeving optical unit and the support line; the stainless sleeving optical unit includes: multiple single-mode fibres and at least one multi-mode fibre, wherein fibres in the stainless sleeving optical unit are mutually hinged.

Further, the support line is a 14% AS line.

Further, the diameter of the support line and the stainless sleeving optical unit is 2.5 mm respectively.

Further, wherein the number of single-mode fibres is 20 and the number of multi-mode fibres is 4.

Further, the length of both the single-mode fibre and the multi-mode fibre is greater than that of the support line.

Further, the mixed-mode temperature measurement communication phase conductor includes a central layer, a first layer, a second layer, a third layer and a fourth layer.

Further, the central layer includes a 14% AS line with diameter of 2.5 mm, which is configured for sustaining the tension in the conductor; the first layer includes 5 14% AS lines with diameter of 2.5 mm, which are configured for sustaining the tension in the conductor, and a stainless sleeving optical unit, which is configured for communication and temperature measurement; the second layer includes 10 aluminium wires with diameter of 3.22 mm, which are configured for transmitting electricity; the third layer includes 16 aluminium wires with diameter of 3.22 mm, which are configured for transmitting electricity; and the fourth layer includes 22 aluminium wires with diameter of 3.22 mm, which are configured for transmitting electricity.

According to another aspect, the disclosure provides a temperature measurement communication system, including: a laser, which is configured for emitting an optical pulse to a multi-mode fibre; a directional coupler, which is configured for separating the reflection light of the optical pulse to obtain an echo; a photoelectric detection device, which is configured for measuring the strength and delay of the echo and calculating the temperature and location of the reflection point of the reflection light according to the strength and delay; a mixed-mode temperature measurement communication phase conductor, which includes: a stainless sleeving optical unit and a support line hinged with the stainless sleeving optical unit, wherein an aluminium wire is hinged outside the stainless sleeving optical unit and the support line; the stainless sleeving optical unit includes: multiple single-mode fibres and at least one multi-mode fibre, wherein fibres in the stainless sleeving optical unit are mutually hinged.

Further, the support line is a 14% AS line.

Further, the diameter of the support line and the stainless sleeving optical unit is 2.5 mm respectively.

Further, the number of single-mode fibres is 20 and the number of multi-mode fibres is 4.

Further, the length of both the single-mode fibre and the multi-mode fibre is greater than that of the support line.

Further, the mixed-mode temperature measurement communication phase conductor includes a central layer, a first layer, a second layer, a third layer and a fourth layer.

Further, the central layer includes a 14% AS line with diameter of 2.5 mm, which is configured for sustaining the tension in the conductor; the first layer includes 5 14% AS lines with diameter of 2.5 mm, which are configured for sustaining the tension in the conductor, and a stainless sleeving optical unit, which is configured for communication and temperature measurement; the second layer includes 10 aluminium wires with diameter of 3.22 mm, which are configured for transmitting electricity; the third layer includes 16 aluminium wires with diameter of 3.22 mm, which are configured for transmitting electricity; and the fourth layer includes 22 aluminium wires with diameter of 3.22 mm, which are configured for transmitting electricity.

The disclosure realizes whole-distance temperature measurement of conductor by setting the single-mode fibre to perform communication and the multi-mode fibre to perform temperature measurement.

BRIEF DESCRIPTION OF THE DRAWINGS

For a better understanding of the disclosure, accompanying drawings described hereinafter are provided to constitute one part of the application; the schematic embodiments of the disclosure and the description thereof are used to illustrate the disclosure but to limit the disclosure improperly. In the accompanying drawings.

DETAILED DESCRIPTION OF THE EMBODIMENTS

It should be noted that the embodiments in the application and the characteristics of the embodiments can be combined if no conflict is caused. The disclosure is described below in detail by reference to the accompanying drawings in conjunction with embodiments.

Figure 1:
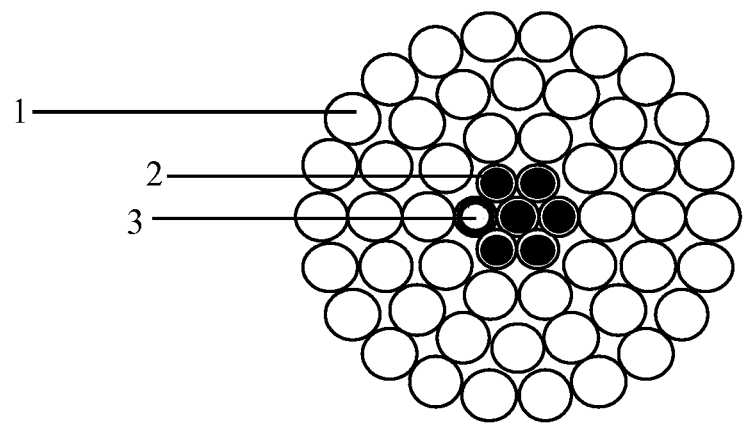
FIG. 1 shows a section diagram of a mixed-mode temperature measurement communication phase conductor provided by the embodiment of the disclosure.

FIG. 1 shows a mixed-mode temperature measurement communication phase conductor provided by the embodiment of the disclosure; as shown in FIG. 1, the mixed-mode temperature measurement communication phase conductor according to the embodiment includes:

a stainless sleeving optical unit 3 and a support line 2 hinged with the stainless sleeving optical unit 3, wherein an aluminium wire 1 is hinged outside the stainless sleeving optical unit and the support line;

the stainless sleeving optical unit 3 includes:

multiple single-mode fibres and at least one multi-mode fibre, wherein fibres are mutually hinged;

in which, the single-mode fibre is configured for communication and the multi-mode fibre is configured for temperature measurement.

For example, the support line is a 14% AS (Aluminium-Clad Steel Stranded Conductor) line, wherein the diameter of the support line and the stainless sleeving optical unit is 2.5 mm respectively; the single-mode fibre is a single-mode G652 fibre, and the multi-mode fibre is a multi-mode G651 fibre.

Preferably, the number of single-mode fibres is 20 and the number of multi-mode fibres is 4.

In order to prevent the fibre from being stretched during the operation of conductor, fibres in the stainless sleeving optical unit reserve certain excess length, for example, the length of both the single-mode fibre and the multi-mode fibre might be greater than that of the support line.

Referring to Table 1, the mixed-mode temperature measurement communication phase conductor provided by the embodiment of the disclosure includes a central layer, a first layer, a second layer, a third layer and a fourth layer, wherein the central layer includes a 14% AS line with diameter of 2.5 mm, which is configured for sustaining the tension in the conductor; the first layer includes 5 14% AS lines with diameter of 2.5 mm, which are configured for sustaining the tension in the conductor, and a stainless sleeving optical unit, which is configured for communication and temperature measurement; the second layer includes 10 aluminium wires with diameter of 3.22 mm, which are configured for transmitting electricity; the third layer includes 16 aluminium wires with diameter of 3.22 mm, which are configured for transmitting electricity; and the fourth layer includes 22 aluminium wires with diameter of 3.22 mm, which are configured for transmitting electricity.

TABLE 1

| | | Name | Number | Diameter |
|---|---|---|---|---|
| Structure Parameters | Central Layer | 14% AS Line | 1 | 2.50 mm |
| | First Layer | 14% AS Line | 5 | 2.50 mm |
| | | Stainless Sleeving Optical Unit | 1 | 2.50 mm |
| | Second Layer | Aluminium Wire | 10 | 3.22 mm |
| | Third Layer | Aluminium Wire | 16 | 3.22 mm |
| | Fourth Layer | Aluminium Wire | 22 | 3.22 mm |

Referring to Table 2, which shows the technical parameters of the mixed-mode temperature measurement communication phase conductor provided by the embodiment of the disclosure.

TABLE 2

| | | |
|---|---|---|
| Technical Parameters | Reference standard: IEEE std 1138 | |
| | Twisting direction of outermost layer is "rightward" | |
| | Number & model of fibre cores | 20 G.652 fibres |
| | | 4 G.651 fibres |
| | Nominal outside diameter | 26.82 mm |
| | Bearing section area | 420.33 mm2 |
| | AS area | 29.45 mm2 |
| | AL area | 390.88 mm2 |
| | Unit weight | 1321.0 kg/km |
| | Rated tensile strength (RTS) | 103.9 kN |
| | Maximum allowable tension (MAT)(40% RTS) | 98.9 N/mm2 |
| | Annual average operating stress (EDS)(25% RTS) | 61.8 N/mm2 |
| | Strain limit stress (70% RTS) | 173.1 N/mm2 |
| | General elastic modulus (E-Modulus) | 64.0 GPa |
| | Coefficient of linear expansion | 21.0 × 10−6/° C. |
| | 20° C. direct-current resistance | 0.0725 Ω/km |
| | Minimum allowed bending radius | 536 mm |
| | Drag-to-weight ratio | 8.02 km |
| | Reference carrying capacity | 40-70° C. 620 A |
| | (Air speed 0.5 m/s, conductor surface absorption coefficient 0.91/k) | 40-80° C. 760 A |
| | (Sunlight intensity 0.1 w/cm2, conductor radiation coefficient 0.91/k) | 40-90° C. 869 A |
| Temperature Range | Mounting temperature | −10° C.~+50° C. |
| | Work and transportation temperature | −40° C.~+80° C. |

Note:
all sizes and data are nominal values

The mixed-mode temperature measurement communication phase conductor provided by the embodiment of the disclosure realizes whole-distance temperature measurement of conductor by setting the single-mode fibre to perform communication and the multi-mode fibre to perform temperature measurement.

Figure 2:
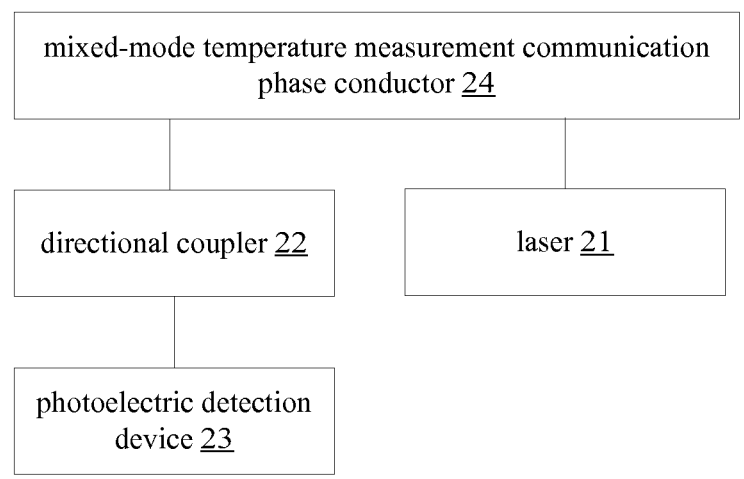
FIG. 2 shows a structure diagram of a temperature measurement communication system provided by the embodiment of the disclosure.

FIG. 2 shows a temperature measurement communication system provided by the embodiment of the disclosure; as shown in FIG. 2, the temperature measurement communication system includes:

a laser 21, which is configured for emitting an optical pulse to a multi-mode fibre;

a directional coupler 22, which is configured for separating the reflection light of the optical pulse to obtain an echo;

a photoelectric detection device 23, which is configured for measuring the strength and delay of the echo and calculating the temperature and location of the reflection point of the reflection light according to the strength and delay;

a mixed-mode temperature measurement communication phase conductor 24, which includes:
a stainless sleeving optical unit and a support line hinged with the stainless sleeving optical unit, wherein an aluminium wire is hinged outside the stainless sleeving optical unit and the support line;
the stainless sleeving optical unit includes:
multiple single-mode fibres and at least one multi-mode fibre, wherein fibres in the stainless sleeving optical unit are mutually hinged;
in which, the single-mode fibre is configured for communication and the multi-mode fibre is configured for temperature measurement.

For example, the support line is a 14% AS line, wherein the diameter of the support line and the stainless sleeving optical unit is 2.5 mm respectively; the single-mode fibre is a single-mode G652 fibre, and the multi-mode fibre is a multi-mode G651 fibre.

Preferably, the number of single-mode fibres is 20 and the number of multi-mode fibres is 4.

In order to prevent the fibre from being stretched during the operation of conductor, fibres in the stainless sleeving optical unit reserve certain excess length, for example, the length of both the single-mode fibre and the multi-mode fibre might be greater than that of the support line.

The mixed-mode temperature measurement communication phase conductor provided by the embodiment of the disclosure includes a central layer, a first layer, a second layer, a third layer and a fourth layer, wherein the central layer includes a 14% AS line with diameter of 2.5 mm, which is configured for sustaining the tension in the conductor; the first layer includes 5 14% AS lines with diameter of 2.5 mm, which are configured for sustaining the tension in the conductor, and a stainless sleeving optical unit, which is configured for communication and temperature measurement; the second layer includes 10 aluminium wires with diameter of 3.22 mm, which are configured for transmitting electricity; the third layer includes 16 aluminium wires with diameter of 3.22 mm, which are configured for transmitting electricity; and the fourth layer includes 22 aluminium wires with diameter of 3.22 mm, which are configured for transmitting electricity, wherein the 14% AS mainly bears tension, the aluminium wire mainly undertakes power transportation, and the stainless sleeving mainly undertakes mechanical protection of 24-core fibre bundle to avoid fibre crushing during transportation, construction and operation.

The temperature measurement communication system in the embodiment of the disclosure can implement whole-distance temperature monitoring point by point on the high-voltage transmission conductor, collect measured information continuously and realize three-phase conductor temperature detection of transmission line in conjunction with three-point full-section contact temperature measurement.

The temperature measurement communication system in the embodiment of the disclosure performs temperature measurement and location using Raman reflection principle. Raman reflection refers that: part light forms backward scattered light and forward scattered light in a fibre after a laser emits an optical pulse to the fibre, then a directional coupler collects the backward scattered light and sends it to a photoelectrical detecting system to perform light intensity and delay analysis. The higher the temperature of the reflection point (that is, the environment temperature of the fibre at this point) is, the greater the intensity of the reflection light is. Then, the backward scattered light collected by the directional coupler is subjected to reflection light intensity and delay analysis, and consequently the temperature and location of the reflection point can be calculated according to an experience model. Since the multi-mode fibre is stronger than the single-mode fibre in reflection, measurement precision is higher; therefore, applying the multi-mode fibre to measuring temperature and the single-mode fibre to performing communication, that is, mixing the single-mode fibre with the multi-mode fibre, can form a mixed-mode fibre technology through colour ring identification.

The temperature measurement communication system provided by the embodiment of the disclosure realizes whole-distance temperature measurement of conductor by setting the single-mode fibre to perform communication and the multi-mode fibre to perform temperature measurement.

The above are only the preferred embodiments of the disclosure and not intended to limit the disclosure. For those skilled in the art, various modifications and changes can be made to the disclosure. Any modification, equivalent substitute and improvement made within the spirit and principle of the disclosure are deemed to be included within the scope of protection of the disclosure.

What is claimed is:

1. A mixed-mode temperature measurement communication phase conductor, comprising:
a stainless sleeving optical unit and a support line attached to the stainless sleeving optical unit, wherein an aluminium wire is attached outside the stainless sleeving optical unit and the support line;
the stainless sleeving optical unit includes:
multiple single-mode fibres and at least one multi-mode fibre, wherein the single-mode fibres are directly attached to the at least one multi-mode fibre in the stainless sleeving optical unit;
wherein the multiple single-mode fibre and the at least one multi-mode fibre that are identified by colours on the structure of the single-mode and multi-mode fibers, are mixed to form a mixed-mode fibre technology;
wherein the length of both the single-mode fibre and the multi-mode fibre is greater than that of the support line.

2. The mixed-mode temperature measurement communication phase conductor according to claim 1, wherein the support line is a 14% AS line.

3. The mixed-mode temperature measurement communication phase conductor according to claim 1, wherein diameter of the support line and the stainless sleeving optical unit is 2.5 mm respectively.

4. The mixed-mode temperature measurement communication phase conductor according to claim 1, wherein the number of single-mode fibres is 20 and the number of multi-mode fibres is 4.

5. The mixed-mode temperature measurement communication phase conductor according to claim 1, wherein the mixed-mode temperature measurement communication phase conductor includes a central layer, a first layer, a second layer, a third layer and a fourth layer.

6. The mixed-mode temperature measurement communication phase conductor according to claim 1, wherein the central layer includes a 14% AS line with diameter of 2.5 mm, which is configured for sustaining the tension in the conductor; the first layer includes 5 14% AS lines with diameter of 2.5 mm, which are configured for sustaining the tension in the conductor, and a stainless sleeving optical unit, which is configured for communication and temperature measurement; the second layer includes 10 aluminium wires with diameter of 3.22 mm, which are configured for transmitting electricity; the third layer includes 16 aluminium wires with diameter of 3.22 mm, which are configured for transmitting electricity; and the fourth layer includes 22 aluminium wires with diameter of 3.22 mm, which are configured for transmitting electricity.

7. A temperature measurement communication system, comprising:
- a laser, which is configured for emitting an optical pulse to a multi-mode fibre;
- a directional coupler, which is configured for separating the reflection light of the optical pulse to obtain an echo;
- a photoelectric detection device, which is configured for measuring the strength and delay of the echo and calculating the temperature and location of the reflection point of the reflection light according to the strength and delay;
- a mixed-mode temperature measurement communication phase conductor, the mixed-mode temperature measurement communication phase conductor includes:
- a stainless sleeving optical unit and a support line attached to the stainless sleeving optical unit, wherein an aluminium wire is attached outside the stainless sleeving optical unit and the support line;
- the stainless sleeving optical unit includes:
- multiple single-mode fibres and at least one multi-mode fibre, wherein the single-mode fibres are directly attached to the at least one multi-mode fibre in the stainless sleeving optical unit;
- wherein the multiple single-mode fibre and the at least one multi-mode fibre identified by colour rings on the structure of the single-mode and multi-mode fibers, are mixed to form a mixed-mode fibre technology;

wherein the length of both the single-mode fibre and the multi-mode fibre is greater than that of the support line.

8. The system according to claim 7, wherein the support line is a 14% AS line.

9. The system according to claim 7, wherein the diameter of the support line and the stainless sleeving optical unit is 2.5 mm respectively.

10. The system according to claim 7, wherein the number of single-mode fibres is 20 and the number of multi-mode fibres is 4.

11. The system according to claim 7, wherein the mixed-mode temperature measurement communication phase conductor includes a central layer, a first layer, a second layer, a third layer and a fourth layer.

12. The system according to claim 7, wherein the central layer includes a 14% AS line with diameter of 2.5 mm, which is configured for sustaining the tension in the conductor; the first layer includes 5 14% AS lines with diameter of 2.5 mm, which are configured for sustaining the tension in the conductor, and a stainless sleeving optical unit, which is configured for communication and temperature measurement; the second layer includes 10 aluminium wires with diameter of 3.22 mm, which are configured for transmitting electricity; the third layer includes 16 aluminium wires with diameter of 3.22 mm, which are configured for transmitting electricity; and the fourth layer includes 22 aluminium wires with diameter of 3.22 mm, which are configured for transmitting electricity.

* * * * *